M. F. EMERSON.
AUTOMATIC GATE.
APPLICATION FILED FEB. 5, 1919.
1,334,992.
Patented Mar. 30, 1920.
2 SHEETS—SHEET 1.
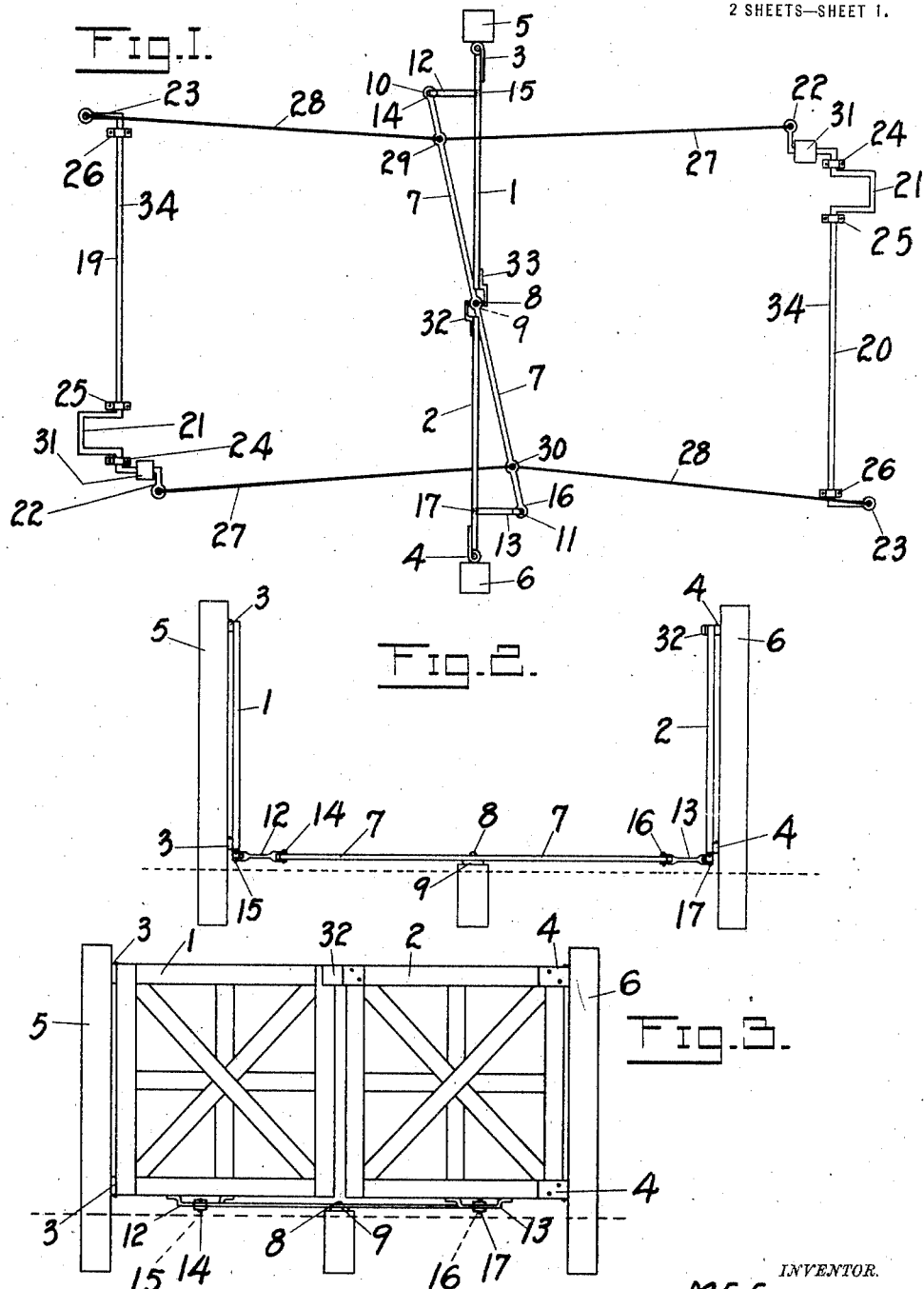
INVENTOR.
M.F. EMERSON.
BY Adam E Fisher
ATTORNEY.

M. F. EMERSON.
AUTOMATIC GATE.
APPLICATION FILED FEB. 5, 1919.
1,334,992.
Patented Mar. 30, 1920.
2 SHEETS—SHEET 2.
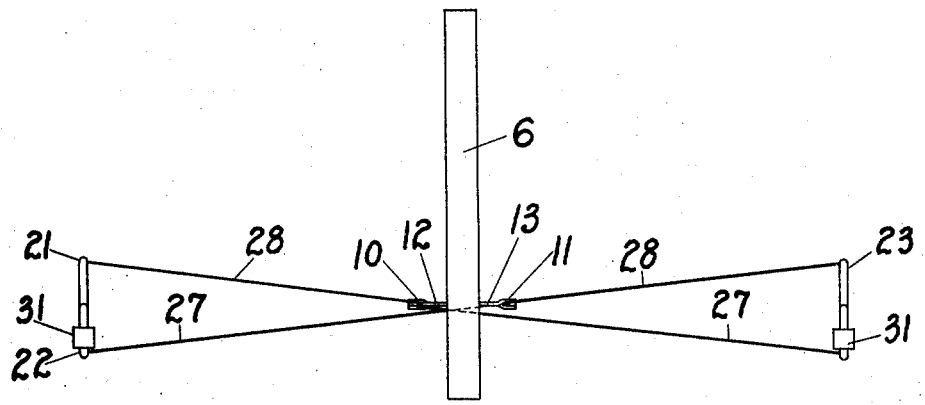
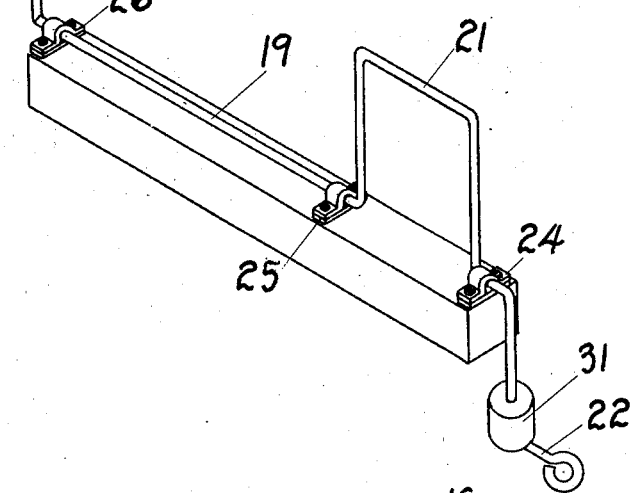
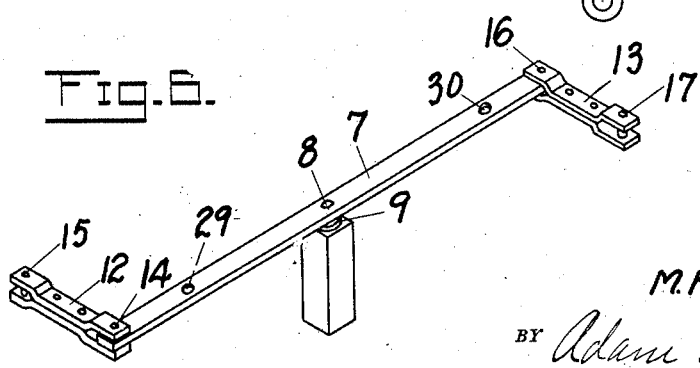
INVENTOR.
M. F. EMERSON,
BY Adam E Fisher
ATTORNEY.

UNITED STATES PATENT OFFICE.

MARSHALL F. EMERSON, OF CAMBRIA, ILLINOIS.

AUTOMATIC GATE.

1,334,992.  Specification of Letters Patent.  Patented Mar. 30, 1920.

Application filed February 5, 1919. Serial No. 275,210.

*To all whom it may concern:*

Be it known that I, MARSHALL F. EMERSON, a citizen of the United States, residing in the city of Cambria and State of Illinois, have invented new and useful Improvements in Automatic Gates, of which the following is a specification, reference being had to the accompanying drawings.

This invention pertains to automatic gates of the class wherein the opening and closing mechanism is operated for the purpose of opening or closing the gate by the passage of the vehicle itself, the wheels of the vehicle tripping certain levers to accomplish the aforesaid purposes.

The main object of the invention is to produce a gate of this character wherein the mechanism and lever system will be comparatively simple and yet efficient, and wherein the said mechanism will be located almost entirely underground and out of the way.

In the drawings—

Figure 1 represents a plan view of my invention;

Fig. 2, an elevation showing the gates in open position through the action of a vehicle wheel upon one of the trip levers;

Fig. 3, a similar view, showing the gates in closed position after the vehicle has passed through, through the action of a wheel of the vehicle upon another of the trip levers;

Fig. 4, a sectional side elevation;

Fig. 5, a detail showing the method of constructing and hanging the trip levers;

Fig. 6, a detail showing the method of constructing and mounting the gate levers.

Referring more particularly to the drawings, my invention consists in two oppositely disposed swinging gates 1 and 2, hingedly mounted by means of the hinges 3 and 4 to the vertical posts 5 and 6. The gates 1 and 2 are adapted to swing together upon a central vertical line, and under the operation of my improved mechanism, will open in opposite directions as will be described.

The main gate lever 7 is mounted upon the central pivot 8 located medially between the ends of the lever 7 and between the posts 3 and 4, aforesaid. The pivot 8 has a sufficient socket 9 to properly sustain the lever 7 in working position. The outer ends 10 and 11 of the lever 7 fall short of meeting the posts 3 and 4 and short gate arms 12 and 13 pivotally connect the outer ends of said main lever 7 with the said gates 1 and 2 by means of the pivot bolts 14, 15, 16 and 17. The pivot bolts 15 and 17 are attached at the under sides of the gates 1 and 2 respectively and at points inwardly approximately one-third the length of each gate, this for the purpose of giving accelerated motion to the gates in opening and closing. The lever 7 is so mounted that the gates 1 and 2 will pass over and clear same in operation. The lever 7 and the gate arms 12 and 13 are of such length and so mounted that when they are in open or extended position they will operate to throw the gates 1 and 2 wide open, and on the other hand when the main lever 7 is rotated upon its central bearing by drawing the ends thereof inwardly through the gate opening, the resulting action will be to close said gates. At spaced distances along the roadway 18 are located the compound trip levers 19 and 20, said trip levers being exact duplicates one of the other, but oppositely disposed. These trip levers are preferably formed from bar iron, each with a medial shaft 34, a U-shaped upstanding target or wheel trip 21, and an adjacent downwardly projecting pull arm 22, at the right hand end, facing the gates, and an upstanding pull arm 23 located at the opposite end. These compound trip levers are suitably journaled below the roadway at the points 24, 25 and 26. From the pull arms 22 and 23 extend the rods 27 and 28 to the main lever 7, being pivotally joined thereto at the points 29 and 30. The pull arms 22 fall below the lever bearings and the counter weights 31 tend to hold the wheel trips 21 in upright position. In Fig. 1 the gate closing means is shown and the U-shaped wheel trip 21 is arranged in a horizontal position and extends outwardly from the gate when the latter is closed. In Fig. 4 is illustrated the means for opening the gate and the U-shaped wheel trips 21 are arranged in a vertical position. When the vertical U-shaped wheel trips are swung downwardly and inwardly toward the gate to open the same, the U-shaped wheel trip of the gate closing means will be carried upward to a vertical position so that a vehicle after passing through the gate-way may engage one of the U-shaped wheel trips of the gate closing means, and swing the same downwardly and outwardly to effect a closing of the gate and a raising of the U-shaped wheel trips of the gate opening means, so that the latter will be in position for another opening operation of the gate.

In operation, the right front wheel of the vehicle passing toward the closed gates 1 and 2 will strike the target or wheel trip 21, whereby an opening stress is exerted upon the main gate lever 7 through the downwardly projecting pull arm 22 and the gates are swung open. As the vehicle passes on through, the left front wheel of the vehicle strikes the other wheel trip lever 21, whereby closing stress is exerted upon the main lever 7 through the upstanding pull arm 23, and the gates are closed. On the return of the vehicle, the operation is repeated from the opposite direction. Oppositely disposed jamb brackets 32 and 33 located one on each of the gates 1 and 2 operate to prevent the gates passing the said central vertical closing line. Suitable concrete or other foundations are also provided.

While I have herein described a certain specific manner and method of constructing the elements of my invention, it is understood that I may vary from the same in minor details, not departing from the spirit of my invention, so as best to construct a practical device for the purpose intended, as defined in the appended claims.

What I claim to be new and patentable is:

1. An automatic farm gate, comprising two gates hingedly mounted at opposite sides of the roadway and closing on a central line across the roadway, a main gate lever pivotally mounted at its center and extending diagonally across the roadway and beneath said gates, short gate arms pivotally connected to the ends of the main gate lever and directly to the said gates at the bottoms thereof at points in advance of the hinged ends of the same, compound trip levers extending across the roadway at opposite sides of the gates and each provided with upstanding wheel trips and a downwardly projecting pull arm at one end and an upstanding pull arm at the opposite end and rods pivotally connecting the pull arms with the main gate lever adjacent the extremities thereof.

2. An automatic farm gate, comprising two gates hingedly mounted at opposite sides of the roadway and closing on a central line across the roadway, a main gate lever pivotally mounted at its center and extending diagonally across the roadway beneath the gates, short gate arms pivoted directly to the gates slightly in advance of the hinged ends of the same and extending therefrom to the ends of the said lever and also pivoted to the same, compound trip levers extending across the roadway at opposite sides of the gates and each formed with an upstanding wheel trip and downwardly projecting pull arm at one end and an upstanding pull arm at the opposite end and means for connecting the arms of the compound trip levers with the gate lever, said means and compound trip levers being arranged to permit a vehicle to open and close the gates.

3. An automatic farm gate comprising two gates hingedly mounted at opposite sides of the roadway, a gate lever centrally mounted beneath the gates and extending diagonally of the roadway, arms pivoted to the ends of the main gate lever and directly to the gates slightly in advance of the hinged ends thereof, compound trip levers extending across the roadway at opposite sides of the gates and each provided at its ends with oppositely extending pull arms and having an intermediate wheel trip and rods connecting the pull arms with the main gate lever at adjacent ends thereof, the wheel trip for one compound lever at each side of the gate being vertical when the wheel trip of the other compound lever at the same side of the gate is horizontal, whereby one of the wheel trips at each side of the gate will be in position for operation at all times when the gate is open or closed.

4. An automatic farm gate comprising two gates hingedly mounted at opposite sides of the roadway and closing on a central line across the roadway, a main gate lever pivotally mounted at its center and extending diagonally across the roadway beneath the gates and roadway, short gate arms each pivotally connecting one of the outer ends of the main gate lever with the under edge of the adjacent gate at a point slightly in advance of the hinged end thereof and a trip lever system mounted beneath the roadway and connected with the said gate lever and operable by passing vehicles for opening and closing said gates.

5. An automatic farm gate comprising two gates hingedly mounted from opposite sides of the roadway and closing on a central line across the roadway, a Z-shaped gate lever system centrally pivoted diagonally between said gates with short lever arms engaging the adjacent gates at medial points along the under edges thereof and connected directly to the same, compound trip levers journaled across and underneath the roadway one on each side of said gates, each formed with an upstanding wheel trip and downwardly projecting pull arm at one end and upstanding pull arm at the opposite end and connecting rods pivotally joining the extremities of the said pull arms with the adjacent extremities of said gate lever.

MARSHALL F. EMERSON.

Witnesses:
WM. BARRINGER,
HOWARD HAGLER.